No. 638,996. Patented Dec. 12, 1899.
N. STOCK.
CASTER ROLLER.
(Application filed June 9, 1899.)
(No Model.)
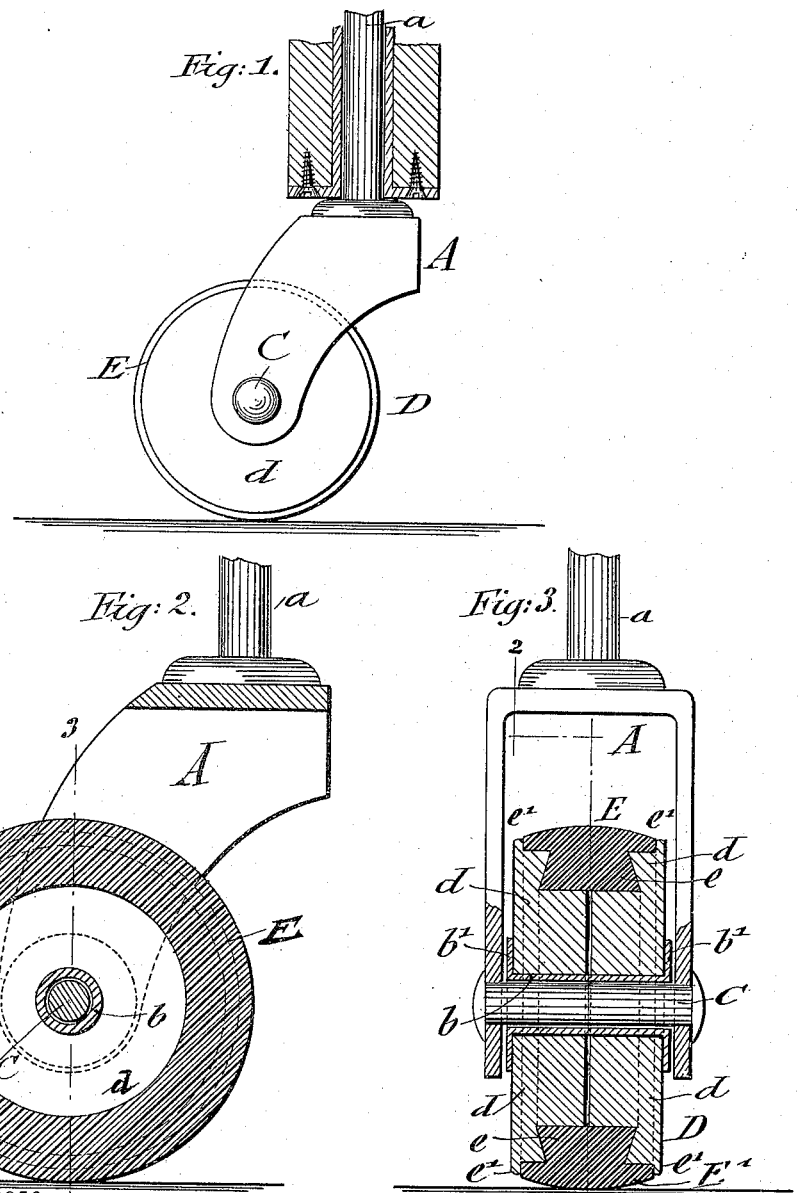
WITNESSES:
INVENTOR
Nicholas Stock
BY
ATTORNEYS.

UNITED STATES PATENT OFFICE.

NICHOLAS STOCK, OF KINGSTON, NEW YORK.

CASTER-ROLLER.

SPECIFICATION forming part of Letters Patent No. 638,996, dated December 12, 1899.

Application filed June 9, 1899. Serial No. 719,902. (No model.)

*To all whom it may concern:*

Be it known that I, NICHOLAS STOCK, a citizen of the United States, residing at Kingston, in the county of Ulster and State of New York, have invented certain new and useful Improvements in Casters, of which the following is a specification.

This invention relates to improvements in casters for furniture in which the roller is provided with a tire of elastic material, so as to avoid the streaking of the hard-wood polished floor when the furniture is rolled over the same, said tire being held firmly in position on the roller, so as to be prevented from slipping off or being subjected to unequal wear.

The invention consists of a roller for furniture-casters formed of two circular sections and provided with a dovetailed circumferential groove, shoulders adjacent to the sides of said groove and circumferential guard-flanges at the outer sides of the roller, and a tire provided with a dovetailed shank retained in said groove, and laterally-extending edge portions resting on said shoulders and abutting against said guard-flanges, the diameter of the tire-tread being larger than the diameter of the guard-flanges.

In the accompanying drawings, Figure 1 represents a side elevation of my improved furniture-caster, showing in section the chair-leg to which it is applied. Fig. 2 is a vertical central section, drawn on a larger scale; and Fig. 3 is a vertical transverse section on line 3 3, Fig. 2.

Similar letters of reference indicate corresponding parts.

Referring to the drawings, A represents the fork-shaped holder of the caster, which is provided with the usual spindle $a$, that is inserted into the leg of the chair or other article of furniture. To the forked holder A is applied by means of a pintle C, that passes through the holes of the holder A, the roller D, said pintle C being provided with enlarged heads, so as to be retained on the holder in the usual manner. The roller D is formed of two circular sections $d$, which are made of metal, rubber, or other suitable material, said roller-sections being held firmly together by means of a sheet-metal sleeve or thimble that passes through their central opening and that is outwardly turned at each end, so as to form retaining-flanges $b'$ $b'$ for the roller-sections $d$ $d$, as shown in Fig. 3. The roller-sections $d$ $d$ preferably abut at their inner faces against each other and are provided with a dovetailed groove in their circumference, into which is inserted the correspondingly-shaped shank $e$ of the tire E of the roller. Adjacent to the dovetailed groove of the roller-sections are arranged two shoulders, and at the upper or outer edge of the roller-sections a circumferential guard-flange $e'$, which flanges serve to protect the outer edge of the tire. The tire is preferably made convex at its outer face and formed of leather, soft rubber, or other suitable elastic material. The tread of the elastic tire E corresponds in width to the distance between the flanges $e'$.

As shown in the figures, the edges of the tire-tread project over and rest upon the flat-topped shoulders, the latter thereby serving to sustain directly a portion of the pressure upon the tire.

The tire is firmly retained by its dovetailed interior shank in the dovetailed groove of the roller-sections, so that no cementing on of the tire is necessary, and it is kept in positive and absolutely-reliable position on the roller without any chance of becoming detached therefrom. As the edges of the tread of the tire are protected by the circumferential guard-flanges of the roller-sections, spreading of the tire is prevented and the wear at the thinner portion of the tire obviated and the whole wear placed on the convex tread. Furthermore, the guard-flanges by preventing side movement of the outer portion of the tire prevent the cutting and wear of the tire by the shoulders at the junction of the shank and tread of the tire, which would otherwise occur and render the roller unfit for use. The guard-flanges therefore serve not only as a direct protection against abrasion of the outer edges of the tread, but serve to protect the entire tire by preventing its sidewise movement in its seat and the consequent cutting on the shoulders. When the elastic tire is worn out by use, it can be readily replaced by removing the worn tire and springing a new tire into place on the roller. When assembling the parts of the roller, it is best to insert the tire in position between the parts of the sections before the same are connected together by the sheet-metal thimble or sleeve. The parts can be assembled quickly, as no cementing of the tire onto the roller is necessary.

A caster with my improved roller moves noiselessly over the floor and does not streak the same even when the floor is varnished or otherwise highly finished, and the replacing of the worn tire with a new tire is conveniently accomplished whenever this is necessary.

Having thus described my invention, I claim as new and desire to secure by Letters Patent—

A roller for furniture-casters, formed of two circular sections, and provided with a dovetailed circumferential groove, shoulders adjacent to the sides of said groove and circumferential guard-flanges at the outer sides of the roller, and a tire provided with a dovetailed shank retained in said groove, and laterally-extending edge portions resting on said shoulders and abutting against said guard-flanges, the diameter of the tire-tread being larger than the diameter of the guard-flanges, substantially as set forth.

In testimony that I claim the foregoing as my invention I have signed my name in presence of two subscribing witnesses.

NICHOLAS STOCK.

Witnesses:
PAUL GOEPEL,
M. H. WURTZEL.